(12) United States Patent
Leason

(10) Patent No.: US 7,043,286 B1
(45) Date of Patent: May 9, 2006

(54) EXTRINSIC SIGNAL TO SHUNT AN ACOUSTIC DRIVER IN A CELLULAR TELEPHONE, PAGER OR THE LIKE

(75) Inventor: David Leason, Chappaqua, NY (US)

(73) Assignee: Leason Holding Company, LLC., Chappaqua, NY (US)

( * ) Notice: Subject to any disclaimer, the term of this patent is extended or adjusted under 35 U.S.C. 154(b) by 445 days.

(21) Appl. No.: 09/880,630

(22) Filed: Jun. 13, 2001

Related U.S. Application Data

(60) Provisional application No. 60/211,300, filed on Jun. 13, 2000.

(51) Int. Cl.
*H04B 7/00* (2006.01)

(52) U.S. Cl. ............... 455/701; 455/422.1; 455/456.1; 455/456.2; 455/418; 455/456.4; 455/417; 455/67.12

(58) Field of Classification Search ............ 455/404.1, 455/561, 411, 456.4, 518, 466, 514, 562.1, 455/565, 418, 420, 426, 63, 456, 76.1, 415, 455/410, 456.2, 456.1, 417, 422.1, 67.12, 455/701; 340/681; 370/95.1
See application file for complete search history.

(56) References Cited

U.S. PATENT DOCUMENTS

| 4,873,712 | A  |   | 10/1989 | Porco |              |
|-----------|----|---|---------|-------|--------------|
| 5,448,569 | A  | * | 9/1995  | Huang et al. | 370/332 |
| 5,924,040 | A  | * | 7/1999  | Trompower | 455/456.2 |
| 6,343,212 | B1 | * | 1/2002  | Weber et al. | 455/404.1 |
| 6,421,544 | B1 | * | 7/2002  | Sawada | 455/565 |
| 6,496,703 | B1 | * | 12/2002 | da Silva | 455/456.4 |
| 6,516,200 | B1 | * | 2/2003  | Schmidt et al. | 455/518 |

OTHER PUBLICATIONS

Farley, "Cellular Telephone Basics," www.privateline.com (17 printed pages on 9 sheets; printed Jul. 2, 2000).
Interactive Week, Crosstalk by Operator No. 9: "Shhhhh Of Courtesy And Cell Phones," Jul. 17, 2000 (1 sheet).
Brain, "'Quiet Zones' Muffle Cell Phone Rings," Howstuffworks.com/news-item81.htm, Jul. 11, 2000 (1 sheet).
Franklin, "How the Bluetooth Short Range Radio System Works: Avoiding Interference," Howstuffworks.com/ bluetooth3.htm (3 printed pages on 2 sheets; printed Jul. 2, 2000).

(Continued)

*Primary Examiner*—Temica Beamer
*Assistant Examiner*—Randy Peaches

(57) ABSTRACT

A method for selectively shunting an acoustic driver within an electronic device detects the presence of a squelch signal from a local emitter and automatically shunts the acoustic driver in response to the detection, free of any communication back to the emitter. The squelch signal originates from an emitter which is positioned extrinsic to the device, and can be broadcast so as to define a zone of influence within which the acoustic drivers of electronic devices will be squelched. In lieu of an acoustic driver, a vibrator can be activated to quietly alert the user of the incoming message while the squelch signal is present. As a result, the invention enables a proprietor to a greater degree of control over ringing and beeping noises generated by such devices when positioned within a designated space. A broadcast system for defining the zone of influence and electronic devices that include circuitry that implement the method are also disclosed.

20 Claims, 2 Drawing Sheets

OTHER PUBLICATIONS

Franklin, "How the Bluetooth Short Range Radio System Works: Bluetooth Basics," Howstuffworks.com/bluetooth3.htm (4 printed pages on 2 sheets; printed Jul. 2, 2000).

Bluelinx, Inc. web pages including "Who We Are/What We Do" (1 sheet), "About Us" (1 sheet), "Products & Services" (1 sheet), "How it Works" (1 sheet), "The Problem" (2 sheets), "Why Q-Zone?" (1 sheet), "Cellular Providers" (1 sheet), "Wireless Customers" (1 sheet), "Benefits for Everyone" (1 sheet), "BlueLinx Press Releases" (4 sheets, pp. 1 through 4).

* cited by examiner

EXTRINSIC SIGNAL TO SHUNT AN ACOUSTIC DRIVER IN A CELLULAR TELEPHONE, PAGER OR THE LIKE

CROSS-REFERENCE TO RELATED APPLICATIONS

This application claims the benefit of U.S. Provisional Application Ser. No. 60/211,300, filed on Jun. 13, 2000, which is herein incorporated by reference in its entirety.

FIELD OF THE INVENTION

The present invention relates to a circuit and method for extrinsically influencing the alert mode of cellular telephones, pagers, personal digital assistants, and the like. The invention enables public spaces such as movie theaters, shows, lecture halls and other designated spaces to be free of interruption from ringing sounds when such devices are addressed, for example, when a call is received at a cellular telephone located within such designated spaces.

BACKGROUND OF THE INVENTION

Many people carry cellular telephones, beepers, and other personal electronic devices ("PEDs"). When incoming telephone calls or pages are received at these devices, an audible alert is sounded (e.g., a ringing or beeping noise emanates) to inform the owner of the incoming message. These audible alerts can be disturbing to nearby persons, and, in some venues, inappropriate. For example, it is inappropriate for someone to have a ringing telephone during a performance in a concert hall. One solution to this burgeoning problem is to give notice to persons entering designated areas that such devices are to be turned off; however, with the proliferation in number of cellular telephones and pagers that are being brought into any given space, there is an increasing need to free individual users of the responsibility of turning off their electronic devices or of setting such devices to a quiet alert mode (e.g., vibrator mode). The present invention satisfies that need by automatically squelching the ringing or beeping noises of any such device while it is within a designated space, regardless of the alert mode setting of a particular device.

SUMMARY OF THE INVENTION

The invention provides in one aspect a method for automatically shunting an acoustic driver within an electronic device so that it does not disturb persons nearby when an incoming message is first being received. The method comprises the steps of detecting the presence of a broadcast squelch signal and automatically shunting the acoustic driver in response to the detecting step. The term "shunt" as used herein, includes switching from one device (e.g., an acoustic driver) to another (e.g., a vibrator), bypassing the current that would otherwise be delivered to the acoustic driver, or open circuiting the acoustic driver so that it cannot form a complete circuit and ring or beep.

The squelch signal can be broadcast so as to define a zone of influence within which the acoustic drivers of electronic devices are squelched. As a result, the invention enables a proprietor to a greater degree of control over ringing and beeping noises generated by such devices when positioned within a designated space. In lieu of an acoustic driver, a vibrator can be activated to alert the user of the incoming message while the squelch signal is being detected.

The invention provides in another aspect a broadcast system that can be used with a device which shunts an acoustic driver which otherwise provides a user with an audible alert concerning an incoming message. The broadcast system comprises a generator which outputs a "squelch" signal having a frequency which, when detected at the device, shunts the acoustic driver. The broadcast system also includes an amplifier connected to the generator output, an antenna, and a transmitter connected between the antenna and the amplifier. The broadcast system defines a zone of influence within which any said device has its respective acoustic driver shunted.

The invention provides in yet another aspect an electronic device which monitors through a detector incoming messages to detect the presence of a squelch signal and generate a control signal at its output when the squelch signal is detected. The electronic device also includes a switch, operatively connected to the output of the detector, to automatically direct the alert signal to a predetermined one of the first and second alert devices while the squelch signal is still being detected. The electronic device can be a cellular telephone, a pager, a personal digital assistant, or other PED.

The invention in its broadest aspect, therefore, responds to a particular broadcast signal by preventing the electronic device from activating any acoustic driver which provides an audible alert at a volume level which is sufficient to distract or disturb a person nearby, that is, within a few feet of the owner of the electronic device. The user still can be advised of the incoming message by connecting a different alert device in response to the broadcast signal. The shunting (or equivalently the suppression in volume) of the audible alert can be for a time period which is coextensive with the detection of the broadcast squelch signal, or for a period extending a short period after the broadcast signal is no longer present.

These and other aspects, features and benefits of the present invention can be better understood with reference to the accompanying Drawings and Detailed Description of the Preferred Embodiment.

DETAILED DESCRIPTION OF THE PREFERRED EMBODIMENT

By way of overview and introduction, the present invention enables a new degree of control over the ringing and beeping noises that emanate from electronic devices such as telephones, pagers, electronic toys and the like, when such devices are brought within a designated space.

Figure 1:
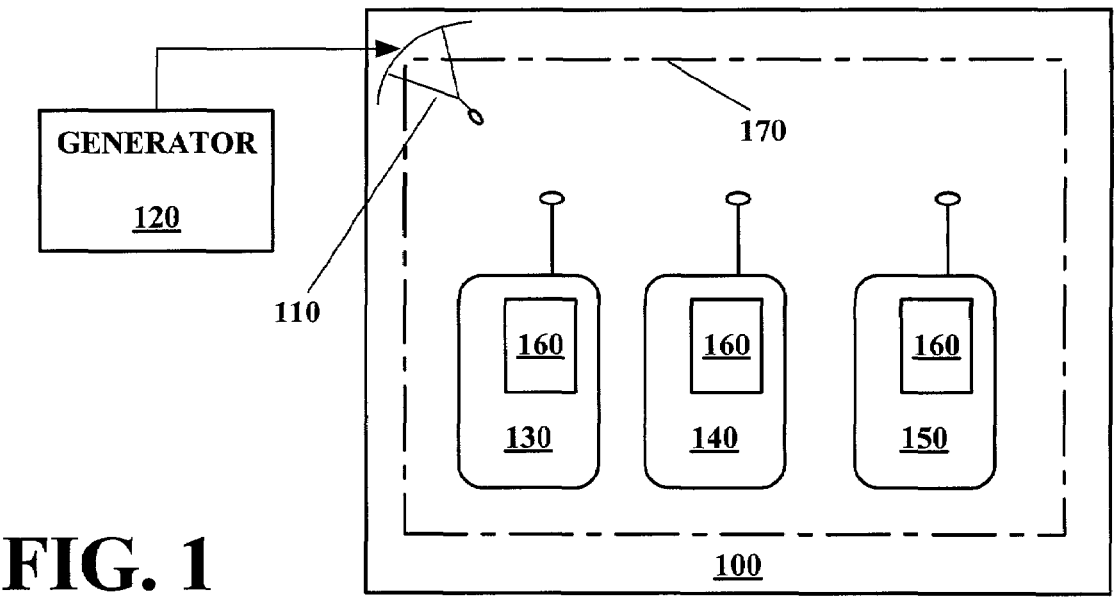
FIG. 1 illustrates a designated space in which one or more cellular telephones, pagers, or other PEDs are present.

FIG. 1 illustrates one such space 100 which can accommodate multiple people and numerous electronic devices. The space itself is not material to the present invention; it can be, by way of example only, a movie theater, a concert hall, a show, a lecture hall, a hospital, a train, a bus, an airplane, or a conference room. The space includes an emitter 110 which is connected to a generator 120. The generator 120 generates a "squelch" signal. The waveform or digital signature of the squelch signal can vary in form, but can be a digital signal such as a header which distinguishes the squelch signal from other information (voice and data) that is received at the device, or can be an analog signal, as understood by those of skill in the art, and can be generated by any conventional signal generator or device which is configured to produce such a waveform or digital signature. Preferably, the squelch signal has a frequency range which is compatible with the receiver circuitry of conventional cellular telephones, pagers, and other PEDs so that it can be processed/conditioned by the existing circuitry within the electroinic device and thereafter detected by a circuit, such as the circuit 160 described below. The squelch signal is preferably emitted at a power level which is set with regard to the size of the space 100 and more preferably has a power level so that the broadcast squelch signal defines a zone of influence 170 which is generally coincident with the space 100.

The variable power level permits emitters to be placed inconspicuously (e.g. up high on a concert hall or theater ceiling).

The generator 120 is connected to conventional amplifier and radio transmitter stages which condition the signal for transmission through the emitter, all of which can be housed together. The emitter is an antenna that directs the squelch signal in a beam pattern which covers the zone of influence 170, or any other pattern as desired, and can be of any conventional design. The antenna can be freely positioned remote from the generator, amplifier, and transmitter to accommodate the requirements of any installation project. For purposes of the present disclosure, the beam pattern of the transmitted squelch signal and the zone of influence 170 are assumed to be coincident with the space 100.

From time to time, persons may bring into the space 100 a cellular telephone 130, pager 140, or other PED 150 such as an electronic toy, each of which can include an acoustic driver for converting a "ring signal" into an audible alert. Devices of this type respond to ring signals when they are being addressed, for example, upon receiving an incoming call or a page. In the case of toys, a "ring signal" refers to the music or sounds that are generated during the play of the game. The audible alert can comprise a variety of sounds and even short tunes which are produced using an acoustic driver such as a piezoelectric element or a speaker. Many devices of this type also include a vibrator which vibrates in response to the ring signal to quietly inform the holder of that device that there is an incoming message (e.g., telephone call or page). The vibrator does not emit an audible alert because an acoustic driver is not used; rather the vibrator buzzes mildly and generally does not attract the attention of persons nearby. When both alert modes are provided, the electronic device permits the user to select the preferred alert mode, and that mode subsists until the user manually changes the alert mode. Thus, only when the user manually selects the vibrator mode does the device holder receive a personal notification of the incoming message which does not disturb persons nearby in the space 100.

In accordance with a preferred embodiment of the invention, a circuit 160 enables such devices to respond to an extrinsic signal by automatically setting all devices within the zone of influence 170 to the vibrator mode. Consequently, each device within the space will be held in the vibrator mode if equipped with the circuit 160 regardless of the alert mode that was selected by the user. Accordingly, proprietors can better limit the number of nuisance interruptions to others due to telephone ringing, pager beeping, and the like by controlling such devices while located within spaces that they designate and establish as a ring-free zone.

Over time, all cellular telephones, pagers, electronic toys and other PEDs can be equipped with the circuit 160.

Figure 2:
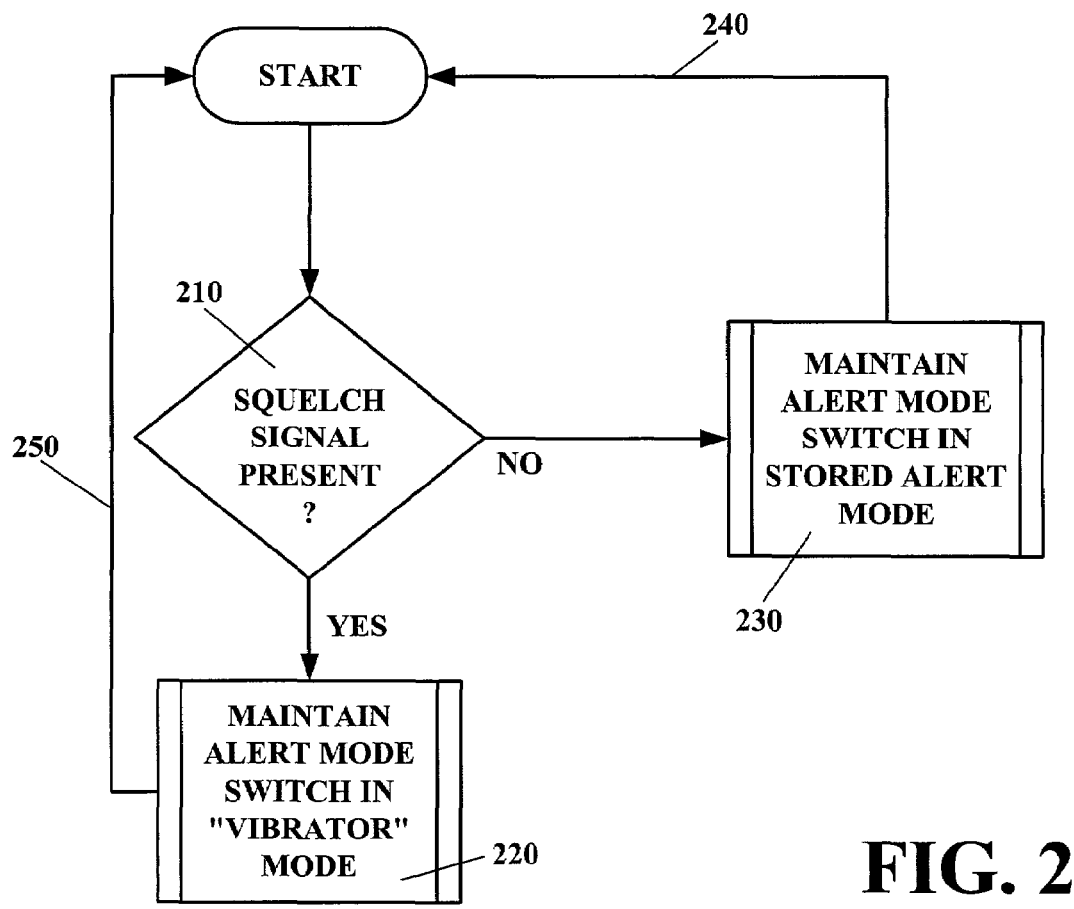
FIG. 2 illustrates a process flow for an electronic device showing the device response to an extrinsic signal, in accordance with the preferred embodiment.

In accordance with a preferred embodiment, a method is described with reference to FIG. 2.

When a device which includes the circuit 160 enters the space 100, the circuit 160 detects the presence of the squelch signal, as tested at step 210. The circuit 160 responds to the presence of the squelch signal by automatically maintaining the device in the "vibrator" mode, as indicated at step 220. Thus, if the device were a cellular telephone which is set to alert the user using the acoustic driver (the "acoustic driver" mode), the effect of the circuit 160 is to automatically bypass the user's setting and instead maintain the telephone in the "vibrator" mode until the telephone is outside of the zone of influence 170. On the other hand, if no squelch signal is detected at step 210, then no action is taken. Thus, the alert mode will remain whatever alert mode the user had manually selected and stored in the device, as indicated at step 230, and the stored setting that the user has selected will be maintained as the active setting for responding to any ringing signal until the squelch signal is detected (see arrow 240).

As indicated by the arrow 250, the circuit 160 can repeatedly test for the presence of the squelch signal and maintain the device in the vibrator mode for so long as it is present. Alternatively, the vibrator mode can be set for a prescribed or random amount of time after detection of the squelch signal. In this alternative arrangement, the circuit 160 can reset to an idle mode in which the squelch signal is again tested (at step 210) automatically or only in response to some action by the user (e.g., the press of a button or powering-on the device to an operational state).

The circuit 160 is described in connection with a conventional cellular telephone 130 of which it can be an integral part. However, the circuit 160 can be included in any type of PED, including but not limited to a pager, personal digital assistant, or electronic toy. Accordingly, the following description of a cellular telephone embodiment applies to other PEDs as well.

Figure 3:
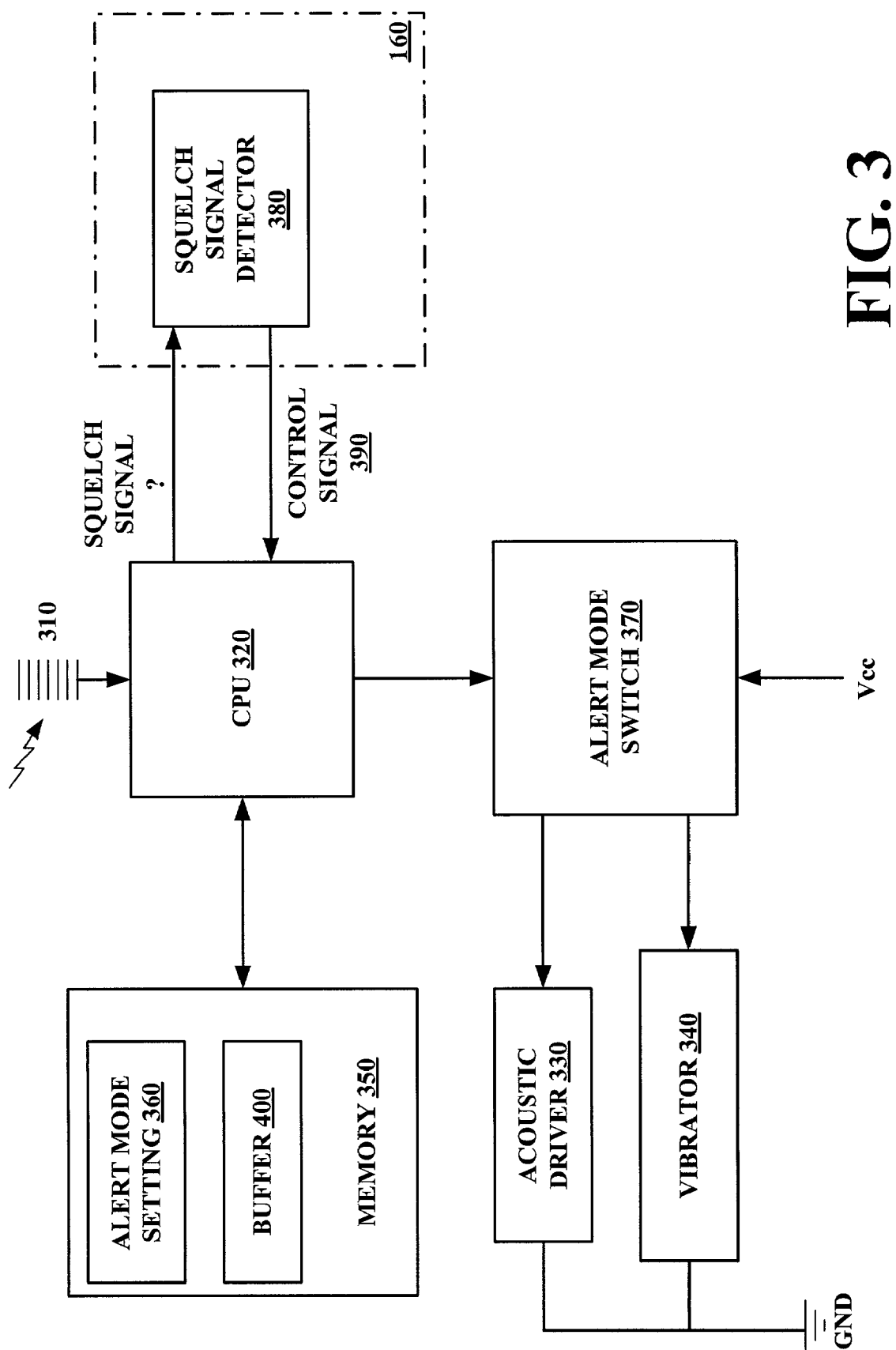
FIG. 3 illustrates a block diagram circuit for implementing the process of FIG. 2.

With reference now to FIG. 3, the cellular telephone 130 includes an antenna 310 which receives and transmits information such as voice and data signals in a conventional manner. Signals from the antenna are passed through conventional circuitry (not shown) and ultimately into a central processing unit ("CPU") 320. The cellular telephone 130 further includes an acoustic driver 330, a vibrator 340, and a memory 350 which, among other things, stores a user-set (or default) alert mode setting 360, as described above. The stored alert mode is referenced by an alert mode switch 370 which directs alert signals to either the acoustic driver 330 or the vibrator 340, depending on the position of the switch 370. The switch is typically implemented using transistors or software, though is schematically illustrated in FIG. 3 as a gated switch.

The circuit 160 complements the above described circuitry by providing a squelch signal detector 380 which generates a control signal 390. The signal detector 380 monitors the signals that arrive at the CPU 320 and detects the presence of the squelch signal. The squelch signal can be routed within the cellular telephone along with the voice information or other data that has been transmitted to the device, or separately, as a matter of design choice for the circuit designer. The detector can comprise a conventional digital signal processor or comparator which compares incoming signals to an expected signal pattern. The detector also can comprise a processor which extracts or derives an indicium of the presence of the squelch signal, when present.

The control signal 390 is generated when the squelch signal is detected. The control signal is used in the preferred embodiment in conjunction with a buffer 400 which can be integral with the memory 350. The buffer 400 is preferably populated with the contents of the alert mode setting 360 until the cellular telephone is brought within the zone of influence 170. Once within the zone of influence, the contents of the buffer 400 are replaced in response to the control signal 390 (a write data signal) with a value which signifies the quiet mode of operation.

The alert mode switch 370 is controlled on the basis of the contents of a buffer 400, and the buffer 400 contains either the default or user-set alert mode value stored in memory 360, or the quiet mode value whenever the squelch signal is not being detected. If only two alert modes are available, a single bit is all that is necessary for storing the possible alert mode values stored in the memory 360 and the buffer 400 (e.g., vibrate mode="0" and acoustic driver mode="1," or vice versa).

When an incoming ring signal is received at the antenna 310 and processed by the CPU 320, a gate signal connects through the switch 370 either the acoustic driver 330 or the vibrator 340 between positive voltage (Vcc) and ground (GND) and causes that device to ring or vibrate, respectively, and thereby alert the user of the incoming message. The switch 370 responds to incoming ring signals by activating either the acoustic driver or the vibrator, depending on the information stored in the buffer 400. The user's preferred alert mode setting 360 will govern how the alert signals are to be directed through the switch 370 (whether to the acoustic driver 330 or the vibrator 340) in the absence of the extrinsic squelch signal.

This arrangement is understood by those of skill in the art as a connectionless protocol. The emitter emits squelch signals in a broadcast manner and any devices within its zone of influence 170 are commanded free of any communication back from the devices under control. This is inherent in a broadcast system of the type described herein.

The buffer 400 can be updated periodically (e.g., twice a minute) using a timer, or dynamically updated in response changes in the presence or absence of the squelch signal. For example, the buffer can be updated when the squelch signal is detected (between steps 210 and 220) and when the squelch signal is not detected (between steps 210 and 230).

The circuit 160 can be a hardwired circuit, etched into an integrated circuit, or executed as a program by the CPU 320 of the device 130, 140 or 150.

While the present invention has been described with respect to a particularly preferred embodiment, the invention is susceptible to implementation in other ways which are within the spirit of the invention which is defined in terms of the recitations of the appended claims and equivalents thereof.

I claim:

1. An electronic device of the type which alerts a user to an incoming message by connecting an alert signal to a preselected one of a first alert device comprising a vibrator and a second alert devices, comprising:
    a) a detector which monitors the incoming message to detect the presence of a squelch signal broadcast locally by an emitter and generates a control signal at its output when the squelch signal is detected;
    b) a processor operatively connected to the output of the detector;
    c) an alert-mode memory-cell storing one of a default binary value and a user-set binary value;
    d) a buffer memory connected to the processor and (i) configured to store a predetermined binary value when the squelch signal is detected in response to the control signal and also (ii) configured to store the contents of the alert-mode memory-cell in the absence of detection of the squelch signal;
    e) a switch, operatively connected to the processor, to (i) automatically direct the alert signal to the vibrator when buffer memory stores the predetermined binary value and (ii) automatically direct the alert signal to a predetermined one of the first and second alert devices as a function of the contents of the buffer memory in the absence of the squelch signal.

2. The electronic device of claim 1, further comprising a circuit configured to populate the buffer memory with the contents of the alert-mode memory-cell when the broadcast squelch signal ceases being detected.

3. The electronic device of claim 1, further comprising a software program which executes in the processor so as to populate the buffer memory with the contents of the alert-mode memory-cell when the broadcast squelch signal ceases being detected.

4. The electronic device of claim 1, wherein the buffer memory is configured to store only one bit.

5. In a device that alerts a user to an incoming message by activating one of an acoustic driver and a vibrator, the device including a buffer memory and an alert-mode memory, the alert mode memory containing one of a default binary value and a user-set binary value, a method for automatically placing the device in a quiet mode of operation comprising the steps of:
    a) detecting the presence of a broadcast squelch signal by monitoring signals that arrive at the device from an emitter;
    b) generating a control signal in response to the detection of the broadcast squelch signal;
    c) writing to the butter memory (i) a first binary value which signifies the quiet mode of operation in response to the generated control signal and (ii) the contents of the alert-mode memory in the absence of the control signal;
    d) controlling a state of an alert mode switch based on the contents of the buffer memory; and
    e) activating (i) the vibrator in response to the incoming message whenever the buffer memory contains the first binary value, and (ii) either the vibrator or the acoustic driver in response to the incoming message whenever the buffer memory contains the contents of the alert-mode memory.

6. The method as in claim 5, the alert mode memory contents are a second binary value different than the first binary value, and wherein the alert mode switch activates the acoustic driver in response to the incoming message whenever the binary value in the buffer memory is the second binary value.

7. The method as in claim 5, wherein the squelch signal originates extrinsic to the device.

8. The method as in claim 5, wherein the detecting step comprises comparing incoming signals that arrive at the device to an expected signal pattern to detect the presence of a squelch signal.

9. The method as in claim 5, wherein the detecting step comprises processing incoming signals that arrive at the device to extract, when present, an indicium of the presence of the squelch signal and thereby detect the presence of a squelch signal.

10. The method as in claim 5, including the additional step of shunting the acoustic driver for a period of time after the broadcast squelch signal is detected.

11. The method as in claim 10, wherein the step of shunting the acoustic driver continues for a period of time after the broadcast squelch signal is no longer present.

12. The method of claim 5, wherein the detecting step monitors a header of the incoming message for inclusion of the broadcast squelch signal.

13. The method of claim 5, wherein the buffer memory is configured to store only one bit.

14. An electronic device of the type which alerts a user to an incoming message by connecting an alert signal to either a vibrator or an acoustic driver, comprising:
   a) a detector which monitors the incoming message to detect the presence of a squelch signal broadcast locally by an emitter and generates a control signal at its output when the squelch signal is detected;
   b) a processor operatively connected to the output of the detector;
   c) an alert-mode memory-cell storing a user-settable binary value;
   d) a buffer memory connected to the processor and configured to store (i) a predetermined binary digit in response to the control signal, and (ii) the contents of the alert-mode memory-cell in the absence of the control signal;
   e) a switch, operatively connected to the processor, to automatically direct the alert signal to (i) the vibrator when buffer memory stores the predetermined binary digit, and (ii) the vibrator or the acoustic driver, as a function of the contents of the buffer memory, in the absence of the control signal.

15. The electronic device of claim 14, further comprising a circuit configured to populate the buffer memory with the contents of the alert-mode memory-cell when the broadcast squelch signal ceases being detected.

16. The electronic device of claim 14, further comprising a software program which executes in the processor so as to populate the buffer memory with the contents of the alert-mode memory, cell when the broadcast squelch signal ceases being detected.

17. The electronic device of claim 14, wherein the buffer memory is configured to store only one bit.

18. The electronic device of claim 14, wherein the detector includes a comparator configured to compare signals in the incoming messages to an expected signal pattern in order to detect the presence of the squelch signal.

19. The electronic device of claim 14, wherein the detector is configured to detect the presence of the squelch signal by extracting an indicium of the presence of the squelch signal.

20. The electronic device of claim 14, wherein the detector is configured to monitor a header of the incoming message for inclusion of the broadcast squelch signal.

* * * * *